May 19, 1931. H. BRUCKER 1,806,144
COFFEEPOT
Filed Jan. 15, 1930
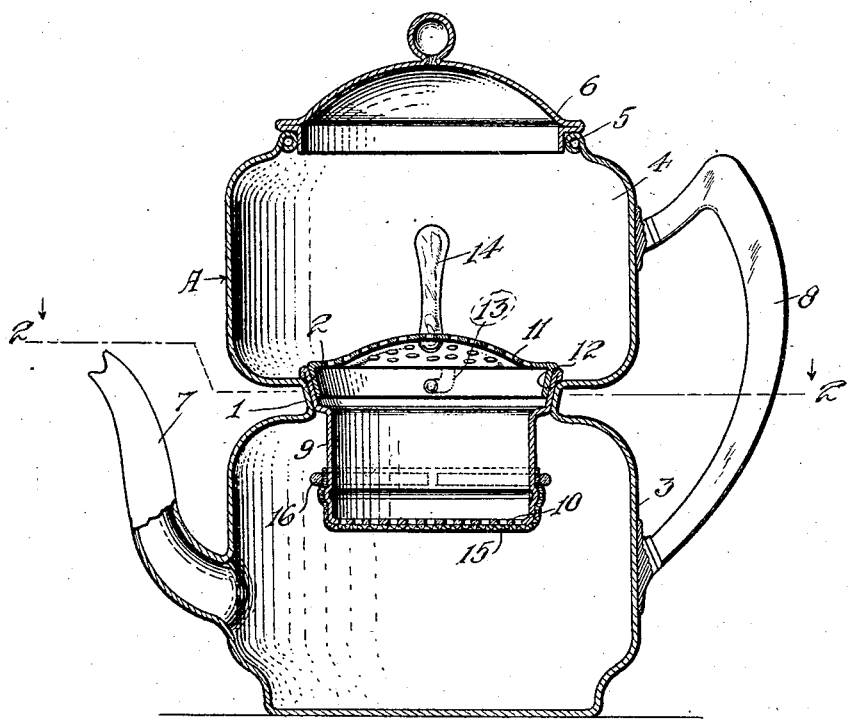
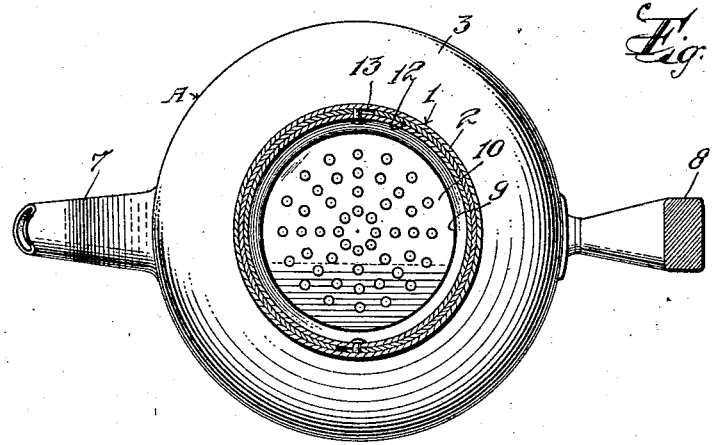
INVENTOR
Henry Brucker,
BY
ATTORNEYS.

Patented May 19, 1931

1,806,144

UNITED STATES PATENT OFFICE

HENRY BRUCKER, OF MAPLEWOOD, NEW JERSEY

COFFEEPOT

Application filed January 15, 1930. Serial No. 420,902.

This invention relates specifically to a coffee pot for producing coffee according to what is known as the drip method, although the invention may be utilized wherever it is desired to extract flavor of juice from a substance according to a similar method.

One object of my invention is to provide a simple and inexpensive apparatus of the character described including top and bottom chambers and an intermediate perforate chamber, whereby when coffee or any other material to be treated is placed in the intermediate chamber and water is placed in the top portion, the water may trickle through the intermediate chamber and drip therefrom into the bottom portion from which it may be poured or drained.

Another object is to provide apparatus of this character including a body divided by an interior annular rib intermediate its ends into top and bottom portions and an intermediate receptacle removably supported by said rib, the top portion having an opening with a closure through which the intermediate receptacle can be applied to and removed from the pot.

Other objects are to provide such apparatus wherein the interior annular rib is tapered downwardly and the interemdiate receptacle has a correspondingly tapered portion so that a substantially water-tight joint is provided between the intermediate receptacle and said rib; to provide apparatus of the character described in which said interior annular rib is formed by pressing the walls of the body inwardly intermediate the ends thereof so that the body may be formed of one piece of material and the apparatus may comprise a small number of simple parts, and to obtain other advantages and results as will be brought out by the following description.

Referring to the accompanying drawings, in which corresponding and like parts are designated throughout the several views by the same reference characters, Figure 1 is a vertical longitudinal sectional view through a coffee pot embodying my invention, and Figure 2 is a horizontal sectional view taken on the line 2—2 of Figure 1.

Specifically describing the embodiment of the invention illustrated in Figures 1 and 2, the reference character A designates the body of the coffee pot, the side walls of which are pressed inwardly intermediate their ends as at 1 to form an interior annular rib 2 which divides the body into a bottom portion or chamber 3 and a top portion or chamber 4. The top portion has a central opening 5 provided with a removable cover 6, the diameter of said opening 5 being somewhat greater than the interior diameter of the annular rib 2. The bottom portion is provided with a pouring spout 7, although any other suitable means such as a spigot or the like for draining the bottom portion may be used. A handle 8 is provided for carrying the pot.

A receptacle 9 to contain coffee or other material to be treated has a perforate body 10 and a perforate cover 11, and is provided with a portion 12 to fit within the annular rib 2 so that the receptacle is suspended upon the said rib. Preferably the rib 2 tapers downwardly, and the portion 12 of the receptacle 9 has a corresponding taper so as to provide a substantially water-tight joint between the receptacle and the rib 2. Any suitable means such as a bayonet slot connection 13 may be provided for removably fastening the cover 11 on the receptacle, and preferably said cover is provided with a handle for applying and removing the receptacle to and from the body A. It is desirable to provide some sort of filter at the bottom of the receptacle and for this purpose I may utilize a piece of cloth or the like 15 which is removably attached to the receptacle by a split spring ring 16 which cooperates with an annular bead 17 in the exterior of the receptacle, the edges of the cloth being clamped between the ring 16 and the bead 17.

In operation, hot water is poured into the top portion 4 and trickles downwardly through the receptacle 9 into the bottom portion 3 from which the liquid may be poured through the spout 7 in the usual way. To remove the material within the receptacle 9 the cover 6 is removed, after which the handle 14 is gripped and the receptacle pulled upwardly through the opening 5. The cover 11 may then be rotated to disengage the bayonet slot connection 13 and remove the cover 11 to permit access to the interior of the receptacle.

One particular advantage of this construction is that a large number of the receptacles for coffee or the like may be filled in advance and placed in the body of the coffee pot as needed, for example for individual service of coffee in hotels, restaurants and the like. The formation of the body in one piece with the coffee receptacle within it, eliminates the objection to known devices of this general character arising out of separate pieces which can be easily displaced or upset in handling of the coffee pot, for example where the body is made of two sections, the upper section can be easily knocked off the lower section. Also the coffee receptacles can be easily and quickly removed from the body of the coffee pot and easily and thoroughly cleaned.

While I have shown and described my invention as embodying certain details of construction, it will be understood that this is primarily for illustrating the preferred embodiment of the invention, and that many modifications and changes may be made in the details of the coffee pot without departing from the spirit or scope of the invention which is defined by the appended claim when construed in the light of the prior art.

Having thus described my invention, what I claim is:

Apparatus of the character described, comprising a body formed of one piece of material having an integral annular reduced portion intermediate its ends providing a downwardly tapered annular interior rib dividing said body into a top portion and a bottom portion, said bottom portion having an outlet opening, a perforate receptacle to contain a substance to be treated having one portion of a diameter less than said rib to pass therethrough and another tapered portion to removably fit said rib in substantially water-tight relation thereto so that said receptacle can be suspended directly upon said rib between said top portion and said bottom portion of the body, said top portion having an opening provided with a closure for application and removal of said receptacle, a perforated handled cover on said receptacle to retain the substance to be treated therein and serve as a handle for applying and removing said receptacle to and from said body, and means for removably securing said cover on said receptacle, whereby liquid placed in said top portion can trickle through said receptacle and drip into said bottom portion.

HENRY BRUCKER.